(12) United States Patent
Singh et al.

(10) Patent No.: US 12,020,161 B2
(45) Date of Patent: Jun. 25, 2024

(54) PREDICTING LAGGING MARKER VALUES

(71) Applicant: INTERNATIONAL BUSINESS MACHINES CORPORATION, Armonk, NY (US)

(72) Inventors: Pranjalya Singh, Bangalore (IN); Surabhi Srivastava, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 897 days.

(21) Appl. No.: 17/094,841

(22) Filed: Nov. 11, 2020

(65) Prior Publication Data

US 2022/0147827 A1 May 12, 2022

(51) Int. Cl.
| | | |
|---|---|---|
| *G06N 3/08* | (2023.01) | |
| *G06F 18/20* | (2023.01) | |
| *G06F 18/211* | (2023.01) | |
| *G06N 3/082* | (2023.01) | |
| *G06N 5/01* | (2023.01) | |
| *G06Q 10/04* | (2023.01) | |
| *G06V 10/75* | (2022.01) | |

(52) U.S. Cl.
CPC ........... *G06N 3/082* (2013.01); *G06F 18/211* (2023.01); *G06F 18/29* (2023.01); *G06N 5/01* (2023.01); *G06Q 10/04* (2013.01); *G06V 10/751* (2022.01)

(58) Field of Classification Search
CPC ........ G06N 3/082; G06N 5/01; G06V 10/751; G06F 18/29; G06F 18/211; G06Q 10/04
See application file for complete search history.

(56) References Cited

U.S. PATENT DOCUMENTS

| | | | |
|---|---|---|---|
| 8,260,627 B2 | 9/2012 | Davidson | |
| 10,936,947 B1 * | 3/2021 | Flunkert | G06N 3/044 |

(Continued)

FOREIGN PATENT DOCUMENTS

| | | | |
|---|---|---|---|
| JP | 2022538132 A * | 6/2020 | |
| WO | 2017106559 A1 | 6/2017 | |

OTHER PUBLICATIONS

Y. Qin, J. Du, X. Wang and H. Lu, "Recurrent Layer Aggregation using LSTM," 2019 International Joint Conference on Neural Networks (IJCNN), Budapest, Hungary, 2019, pp. 1-8, doi: 10.1109/IJCNN.2019.8852077. (Year: 2019).*

(Continued)

*Primary Examiner* — Barbara M Level
(74) *Attorney, Agent, or Firm* — Robert R. Aragona

(57) ABSTRACT

An embodiment for training a forecasting model is provided. The embodiment may include receiving a first 12-month history of a plurality of leading markers. The embodiment may also include submitting the first plurality of leading markers to a convolutional neural network model. The embodiment may further include submitting a first output of the second convolution layer to the aggregation layer. The embodiment may also include generating one or more feature summaries and one or more first lagging markers. The embodiment may further include training the convolutional neural network model. The embodiment may also include removing the regression layer. The embodiment may further include creating a decision tree model and training the decision tree model to generate one or more updated first lagging markers.

17 Claims, 6 Drawing Sheets

(56) References Cited

U.S. PATENT DOCUMENTS

| | | | | |
|---|---|---|---|---|
| 11,281,969 | B1* | 3/2022 | Rangapuram | G06N 7/01 |
| 11,367,142 | B1* | 6/2022 | Wang | G06F 16/2456 |
| 11,481,627 | B2* | 10/2022 | Qiu | G06N 3/08 |
| 11,568,260 | B2* | 1/2023 | Weintraub | G06F 18/2431 |
| 11,630,928 | B2* | 4/2023 | Rajendran | G06F 30/20 |
| | | | | 703/2 |
| 11,663,493 | B2* | 5/2023 | Shashikant Rao | G06N 5/01 |
| | | | | 706/13 |
| 2013/0060603 | A1 | 3/2013 | Chadwick | |
| 2017/0147788 | A1* | 5/2017 | Ohnemus | G16H 20/30 |
| 2018/0121791 | A1* | 5/2018 | O'Connor | G06N 3/049 |
| 2019/0130425 | A1* | 5/2019 | Lei | G06Q 30/0201 |
| 2019/0318822 | A1* | 10/2019 | Zhang | G16H 30/40 |
| 2020/0065669 | A1* | 2/2020 | Okadome | G06Q 30/0202 |
| 2020/0110981 | A1* | 4/2020 | Yan | G06N 3/049 |
| 2021/0133555 | A1* | 5/2021 | Qiu | G06N 3/082 |

OTHER PUBLICATIONS

Chih-Fong Tsai, Yen-Jiun Chiou, Earnings management prediction: A pilot study of combining neural networks and decision trees, Expert Systems with Applications, vol. 36, Issue 3, Part 2, Apr. 2009, pp. 7183-7191 (Year: 2009).*

Brownlee, Jason, Deep Learning Mastery, Deep Learning Models for Univariate Time Series Forecasting, Aug. 28, 2020, pp. 1-43 (Year: 2020).*

BoostedML, Articles on Statistics and ML for Healthcare, Neural Networks and Deep Learning, 1-d Convolutional Neural Networks for Time Series: Basic Intuition, Alex, Apr. 14, 2020. 14 pages. (Year: 2020).*

Y, Fisher et al., UC Berkeley, Deep Layer Aggregation, CVPR 2018 Paper, Open Access version, Computer Vision Fondatio, pp. 2403-2412 (Year: 2018).*

Visualizing ML Models with LIME, UC Business Analytics R Programming Guide, Archive Jun. 29, 2020 retreived at https://web.archive.org/web/20200629132150/htps://uc-r.github.io/lime, 23 pages. (Year: 2020).*

Anshari et al. "Customer relationship management and big data enabled: Personalization & customization of services," Applied Computing and Informatics 15 (2019) pp. 94-100.

Altexsoft, "Customer Churn Prediction Using Machine Learning: Main Approaches and Models," KDnuggets News, Accessed Apr. 23, 2020, https://www.kdnuggets.com/2019/05/churn-prediction-machine-learning.html, 13 pages.

Mell et al., "The NIST Definition of Cloud Computing", National Institute of Standards and Technology, Special Publication 800-145, Sep. 2011, 7 pages.

* cited by examiner

PREDICTING LAGGING MARKER VALUES

BACKGROUND

The present invention relates generally to the field of computing, and more particularly to a cognitive system for predicting values of lagging markers.

Cognitive computing relates to the field of technology platforms that simulate the human thought process in complex situations where answers may be ambiguous and uncertain. These technology platforms may combine machine learning, reasoning, natural language processing, speech, vision, and human computer interaction that mimic the functioning of the human brain. Clients are at the heart of what makes a particular business successful. In the current marketplace, clients have a wide variety of businesses to choose from, thereby resulting in competition among these businesses for customer loyalty. Businesses that thrive in such a competitive environment are those who make client relations a top priority. A popular notion in the marketplace is that acquiring new clients is more difficult and expensive than maintaining an existing client base. By carefully analyzing data pertaining to a client, the business may make efforts to enhance their offerings to suit the client's perspective. Hence, the business may be able to reduce client turnover rates.

SUMMARY

According to one embodiment, a method, computer system, and computer program product for training a forecasting model is provided. The embodiment may include receiving a first 12-month history of a plurality of leading markers. The embodiment may also include submitting the first plurality of leading markers to a convolutional neural network model. The convolutional neural network model may include a first convolution layer, a second convolution layer, an aggregation layer, and a regression layer. The embodiment may further include submitting a first output of the second convolution layer to the aggregation layer. The embodiment may also include generating one or more feature summaries based on a first output of the aggregation layer. The embodiment may further include generating one or more first lagging markers using the regression layer. The generated one or more first lagging markers may be based on the one or more feature summaries. The embodiment may also include training the convolutional neural network model. The training may be based on a learned weighted sum of one or more aggregated values of the one or more feature summaries. The embodiment may further include removing the regression layer from the convolutional neural network model. The embodiment may also include creating a decision tree model. The decision tree model may be based on the one or more feature summaries. The embodiment may further include training the decision tree model. The training may be based on the one or more feature summaries to generate one or more updated first lagging markers.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
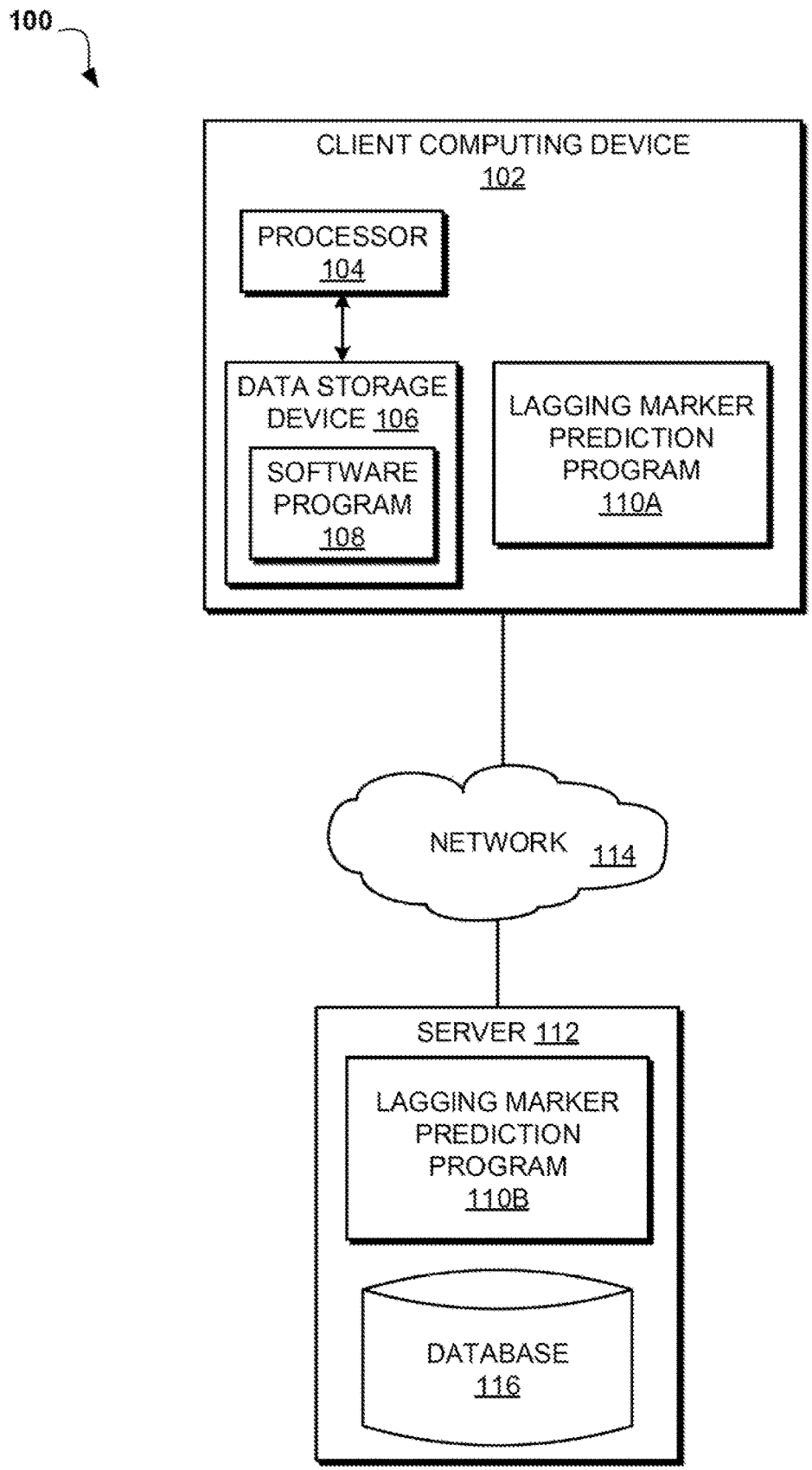
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a system for predicting values of lagging markers. The following described exemplary embodiments provide a system, method, and program product to, among other things, use a cognitive solution to capture leading markers and, accordingly, provide forecasts of the metrics for lagging markers. As used herein, "leading markers" may include, but are not limited to, business offerings, innovation, adaptability, agreement on and fulfillment of deliverables, incident counts, remedial response, resource allocations, volume of other opportunities, and client governance issues. "Lagging markers" may refer to the forecasts of the metrics of a client-business relationship. Therefore, the present embodiment has the capacity to improve the technical field of predicting values of lagging markers by creating a hybrid architecture combining convolutional neural networks for capturing temporal patterns with decision trees for providing explainable insights into the generated forecasts. The present embodiment also improves the technical field of predicting values of lagging markers by first training a forecasting model to more accurately predict values of the lagging markers, and thus guide the business to proactively take measures to retain the client.

As previously described, cognitive computing relates to the field of technology platforms that simulate the human thought process in complex situations where answers may be ambiguous and uncertain. These technology platforms may combine machine learning, reasoning, natural language processing, speech, vision, and human computer interaction that mimic the functioning of the human brain. Clients are at the heart of what makes a particular business successful. In the current marketplace, clients have a wide variety of businesses to choose from, thereby resulting in competition among these businesses for customer loyalty. Businesses that thrive in such a competitive environment are those who make client relations a top priority. A popular notion in the marketplace is that acquiring new clients is more difficult and expensive than maintaining an existing client base. By carefully analyzing data pertaining to a client, the business may make efforts to enhance their offerings to suit the client's perspective. Hence, the business may be able to reduce client turnover rates. However, unhappy and dissatisfied clients may lead to high market rejection rates. On average, 13% of clients may inform up to 20 people of their experience, which may work against a business's interest. This problem is typically addressed by incorporating strategies to remedy some aspect of a relationship with a client. These strategies may take months to manifest an impact, and in the meantime clients may be approached by rival businesses. It may therefore be imperative to have a system in place to carefully analyze data pertaining to clients. Thus, embodiments of the present invention may provide advantages including, but not limited to, enhancing a business's offerings to suit the perspective of a client, allowing a business to proactively take measures to keep clients satisfied before the clients can be approached by a competitor, and ushering the business's strategies to a preemptive response state rather than a reactive response state.

According to at least one embodiment, a hybrid forecasting model may be trained. The first 12-month history of the plurality of leading markers may be received by the system. The first 12-month history of the plurality of leading markers may be leading markers from a period prior to the previous 12 months of a current date. For example, if the current date is Jan. 14, 2020, the period may be from Jan. 13, 2018 until Jan. 13, 2019. The first plurality of leading markers may be submitted to the convolutional neural network model. The convolutional neural network model may include the first convolution layer, the second convolution layer, the aggregation layer, and the regression layer. The first output of the second convolution layer may be submitted to the aggregation layer. The one or more feature summaries may be generated based on the first output of the aggregation layer. "Feature summaries" may be a number between zero and 1 which quantifies a historical leading marker, i.e., a leading marker from the period prior to the previous 12-months of a current date. The regression layer may generate the one or more first lagging markers based on the one or more feature summaries. The one or more first lagging markers may be a lagging marker generated during the training of the hybrid forecasting model. The convolutional neural network model may be trained based on the learned weighted sum of the one or more aggregated values of the one or more feature summaries. The regression layer may be removed from the convolutional neural network model. The system may create the decision tree model based on the one or more feature summaries. The decision tree model may be trained to generate the updated one or more first lagging markers.

The values of the lagging markers may be predicted. A second 12-month history of a plurality of leading markers may be received by the system. The second 12-month history of the plurality of leading markers may be leading markers from a period within the past 12 months of a current date. For example, if the current date is Jan. 14, 2020, the period may be from Jan. 14, 2019 until Jan. 14, 2020. The second plurality of leading markers may be submitted to the convolutional neural network model. The convolutional neural network model may include the first convolution layer, the second convolution layer, and the aggregation layer. A second output of the second convolution layer may be submitted to the aggregation layer. One or more temporal feature summaries may be generated based on a second output of the aggregation layer. Temporal feature summaries may be a number between zero and 1 which quantifies a current leading marker, i.e., a leading marker from the period within the past 12 months of a current date. The one or more temporal feature summaries may be submitted to the decision tree model. One or more second lagging markers may be generated based on the one or more temporal feature summaries. The one or more second lagging markers may be lagging markers generated during the forecasting component of the process. An output of the decision tree model may be presented with a lime visualization model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to use a cognitive solution to capture leading markers and provide forecasts of the metrics for lagging markers.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a lagging marker prediction program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a lagging marker prediction program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the lagging marker prediction program 110A, 110B may be a program capable of enhancing a business's offerings to suit the perspective of a client, allowing a business to proactively take measures to keep clients satisfied before the clients can be approached by a competitor, and ushering the business's strategies to a preemptive response state rather than a reactive response state. The forecast training and prediction method is explained in further detail below with respect to FIGS. 2 and 3.

Figure 2:
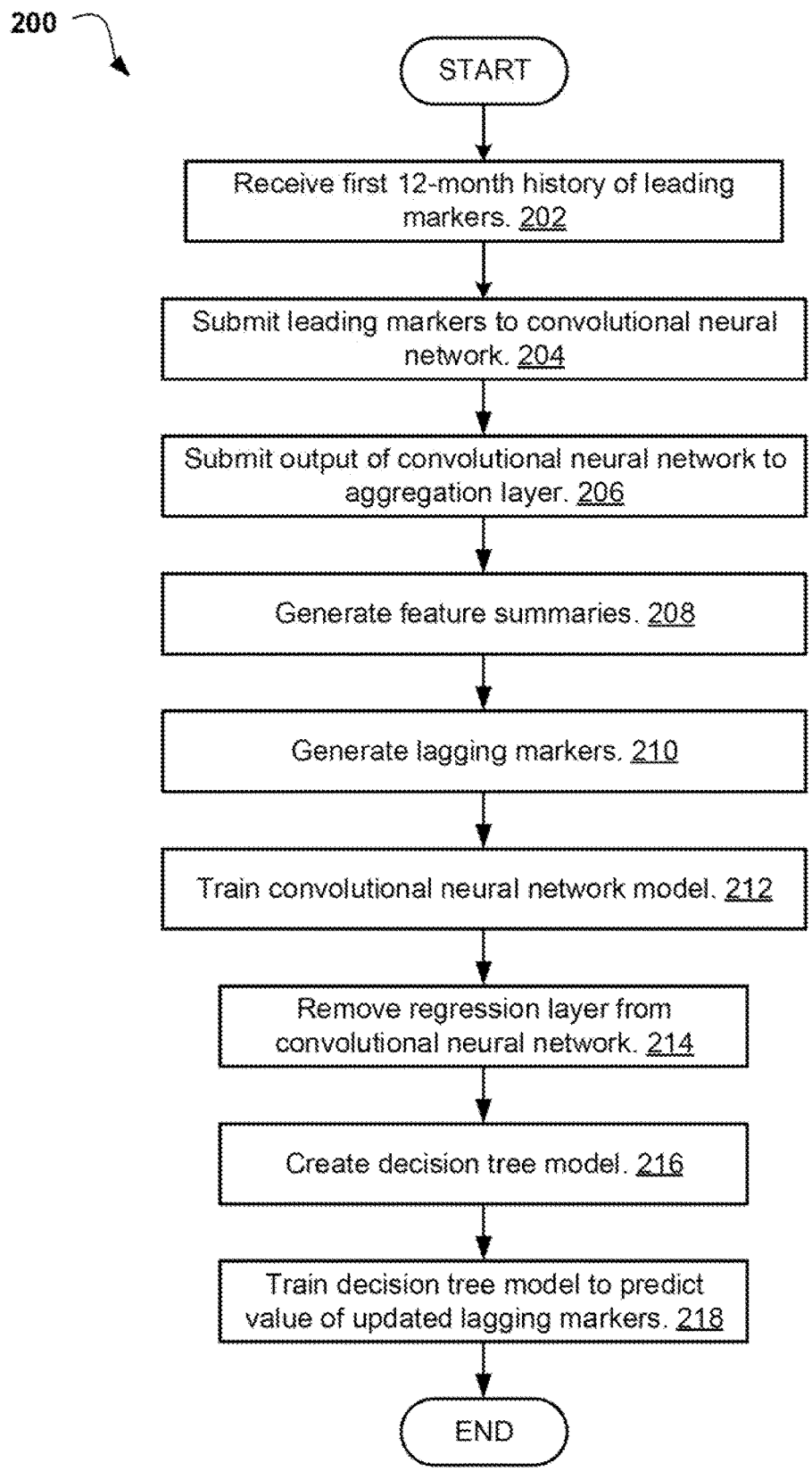
FIG. 2 illustrates an operational flowchart for training a forecasting model in a lagging marker prediction process according to at least one embodiment.

Referring now to FIG. 2, an operational flowchart for training a forecasting model in a lagging marker prediction process 200 is depicted according to at least one embodiment. At 202, the lagging marker prediction program 110A, 110B receives the first 12-month history of the plurality of leading markers. Using a software program 108 on the user's device (e.g., the user's computer 102), the first plurality of leading markers may be collected from a variety of data sources, such as revenue, sales, service agreement information (base and modifications), contract details, payments (scheduled and defaults), major incidents and changes, opportunities (created and won) on various fronts, and survey data. The first plurality of leading markers may be a historical record of all relevant interactions of multiple clients with a particular business. For example, a number of on-time deliveries to the client may be a relevant factor in forecasting the metrics of lagging markers.

Then, at 204, the lagging marker prediction program 110A, 110B submits the first plurality of leading markers to the convolutional neural network model. The lagging marker prediction program 110A, 110B may utilize an application programming interface (API) in order to submit the first plurality of leading markers to the convolutional neural network model. The API may be a software intermediary that sends a request to a provider and delivers a response. The convolutional neural network may include the first convolution layer, the second convolution layer, the aggregation layer, and the regression layer. The first convolution layer may consist of eight one-dimensional filters of size three, and the second convolution layer may consist of eight one-dimensional filters of size four.

Next, at 206, the lagging marker prediction program 110A, 110B submits the first output of the second convolution layer to the aggregation layer. The lagging marker prediction program 110A, 110B may utilize the API as described above to submit the first output of the second convolution layer to the aggregation layer. The output of the second convolution layer may be a set of arrays of numbers dependent upon the number of filters, the size of filters, and dimensions of the input. For example, if the input of the first 12-month history of leading markers is submitted to the first convolution layer with eight filters of size three each, the output of the first convolution layer may be eight arrays of ten numbers, i.e., the filter size subtracted from the input, added to one (12−3+1). Continuing the previous example, upon submission of the output of the first convolution layer to the second convolution layer, there may be generated eight arrays of seven numbers, i.e., (10−4+1). A separate set of arrays of numbers may be generated for each leading marker of the first plurality of leading markers. For example, if a particular implementation has ten leading markers, then ten separate arrays of numbers may be generated.

Then, at 208, the lagging marker prediction program 110A, 100B generates the one or more feature summaries. The one or more feature summaries may be based on the first output of the aggregation layer. The first output of the aggregation layer may be a single value corresponding to each leading marker of the first plurality of leading markers. The aggregation layer may receive the set of arrays of numbers from the first output of the second convolution layer for each leading marker of the first plurality of leading markers and perform a weighted sum to obtain the single value. The one or more feature summaries may quantify an historical leading marker, i.e., a leading marker from the period prior to the previous 12-months of a current date.

Next, at 210, the lagging marker prediction program 110A, 110B generates the one or more first lagging markers. The lagging marker prediction program 110A, 110B may utilize the regression layer to generate the one or more first lagging markers. The one or more first lagging markers may be generated based on the one or more feature summaries. The value of the one or more first lagging markers may be calculated based on the weighted sum of the one or more aggregated values of the one or more feature summaries corresponding to the first plurality of leading markers. The one or more first lagging markers may be lagging markers generated during the training of the hybrid forecasting model, i.e., the predicted value of the one or more first lagging markers may not be used in the prediction forecast. For example, if the first plurality of leading markers are 0.42 for leading marker one, 0.91 for leading marker two, −0.68 for leading marker three, and −0.57 for leading marker four, where 0.42, 0.91, −0.68, and −0.57 are feature summaries, the generated first lagging marker may be 0.78 no risk, i.e., there is a 78% chance of retaining the client.

Then, at 212, the lagging marker prediction program 110A, 110B trains the convolutional neural network model. The convolutional neural network model may learn the weighted sum of the one or more aggregated values of the one or more feature summaries in order to find the most accurate mapping from the inputs to the outputs. The convolutional neural network model may be trained with the input of the first 12-month history of the plurality of leading markers being received by the model, and the model may calculate the output of the value of the one or more first lagging markers. The calculated output of the value of the one or more first lagging markers may be compared with the actual output from the dataset. The weighted sum of the one or more aggregated values of the one or more feature summaries may then be updated to move the calculated output of the value of the one or more first lagging markers closer to the actual output from the dataset. For example, the value of 0.78 for the first lagging marker described above may be compared with the actual value of 0.91, where 0.91 is a feature summary. Continuing with the example, the internal weights of the layers of the convolutional neural network model may be updated so that the calculated value of 0.78 moves closer to 0.91.

Next, at 214, the lagging marker prediction program 110A, 110B removes the regression layer from the convolutional neural network model. The first output of the aggregation layer may be intercepted by the lagging marker prediction program 110A, 110B before the output is submitted to the regression layer. The first output of the aggregation layer may therefore be submitted directly to the decision tree model without processing by the regression layer.

Then, at 216, the lagging marker prediction program 110A, 110B creates the decision tree model. The decision tree model may be created by submitting the first output of the aggregation layer, i.e., the one or more feature summaries, directly to the decision tree model. For example, feature summaries 0.42, 0.91, −0.68, and −0.57 described above may be submitted by the lagging marker prediction program 110A, 110B to the decision tree model.

Next, at 218, the lagging marker prediction program 110A, 110B trains the decision tree model to generate the one or more updated first lagging markers. The decision tree model may be trained utilizing the one or more feature summaries as input. The decision tree model may process the one or more feature summaries as described in step 210, where the value of the one or more first lagging markers may be calculated based on the weighted sum of the one or more aggregated values of the one or more feature summaries corresponding to the first plurality of leading markers. The generated output of the one or more updated first lagging markers may then be compared with the actual output from the dataset, as described in step 212.

Figure 3:
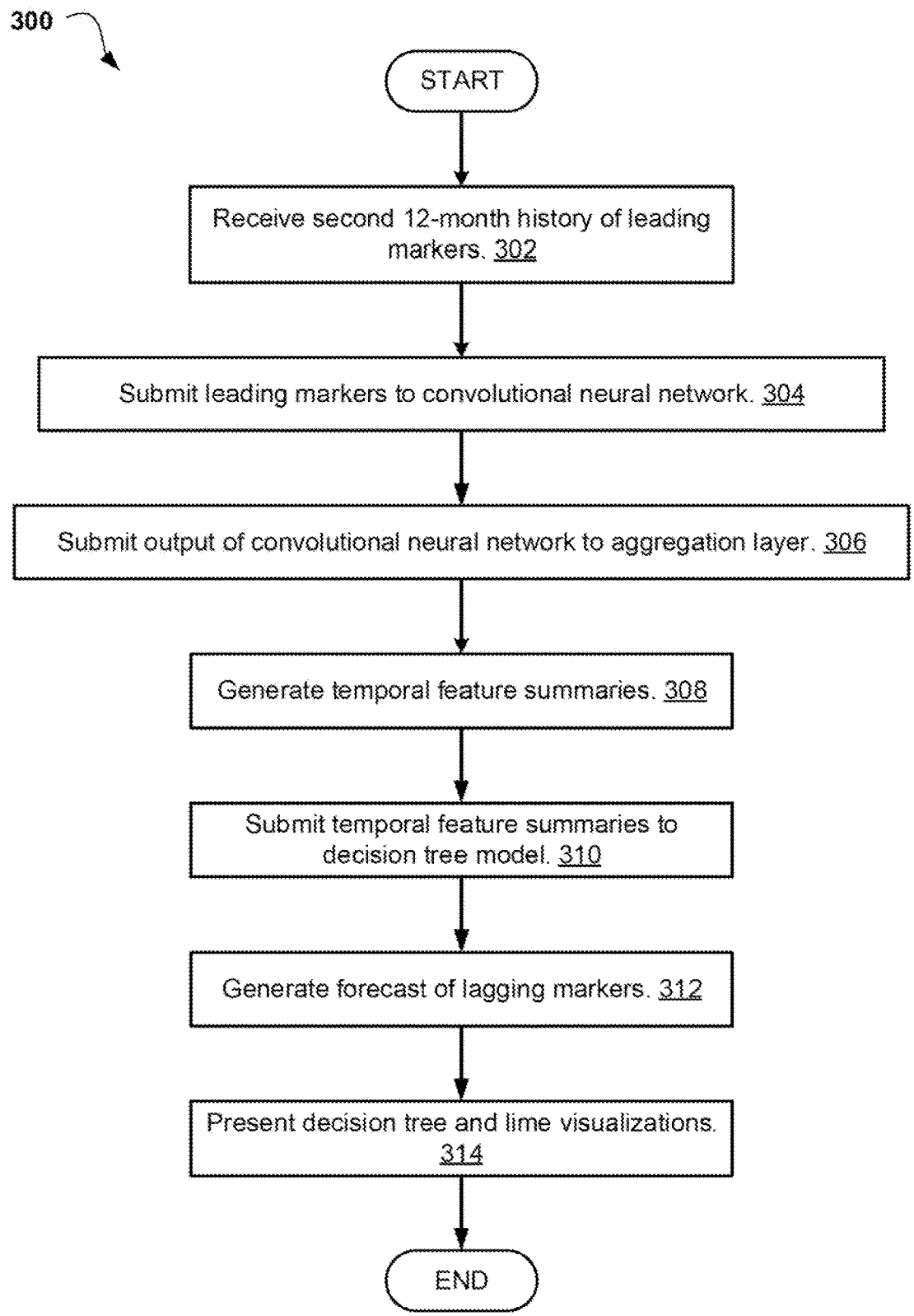
FIG. 3 illustrates an operational flowchart for predicting values of lagging markers in a lagging marker prediction process according to at least one embodiment.

Referring now to FIG. 3, an operational flowchart for predicting values of lagging markers in a lagging marker prediction process 300 is depicted according to at least one embodiment. At 302, the lagging marker prediction program 110A, 110B receives the second 12-month history of the plurality of leading markers using the software program 108 described in step 202. According to at least one other embodiment, the lagging marker prediction program 110A, 110B may receive the second 12-month history of the plurality of leading markers concurrently with the first 12-month history of the plurality of leading markers. In the present embodiment, the second plurality of leading markers may be collected from the data sources described above. The second plurality of leading markers may be leading markers from the period within the past 12 months of a current date. For example, as described above, if the current date is Jan. 14, 2020, the period may be from Jan. 14, 2019 until Jan. 14, 2020.

According to at least one other embodiment, the received second 12-month history of the plurality of leading markers may lag by one month, two months, or three months for forecasting the one or more second lagging markers one month, two months, or three months into the future, respectively. Three separate convolutional neural network and decision tree models may be trained for each second lagging marker as described in steps 212 and 218, where the first model may receive the second 12-month history of the plurality of leading markers lagging by one month, the second model may receive the second 12-month history of the plurality of leading markers lagging by two months, and the third model may receive the second 12-month history of the plurality of leading markers lagging by three months. The weighted sum of the one or more aggregated values of the one or more feature summaries corresponding to the second plurality of leading markers may thus be a different set of weights for the first model lagging by one month, the second model lagging by two months, and the third model lagging by three months. For a monthly prediction into the future, the weighted sum of the one or more aggregated values of the one or more feature summaries may be aggregated on a monthly basis. Hence, the rows in the dataset may have one entry for each month, rather than several entries corresponding to each day within the month. The first model may lag by one month from the time-stamp for which each second lagging marker is available for each account, the second model may lag by two months from the time-stamp for which each second lagging marker is available for each account, and the third model may lag by three months from the time-stamp for which each second lagging marker is available for each account. For example, as described above, taking the period from Jan. 14, 2019 until Jan. 14, 2020, where Jan. 14, 2020 is the timestamp of the current date, the 12-month history of the first model may end in December 2019, the 12-month history of the second model may end in November 2019, and the 12-month history of the third model may end in October 2019.

In the present embodiment, at 304, the lagging marker prediction program 110A, 110B submits the second plurality of leading markers to the convolutional neural network model. The lagging marker prediction program 110A, 110B may utilize the API as described above to submit the second plurality of leading markers to the convolutional neural network. The convolutional neural network model may include the first convolution layer, the second convolution layer, and the aggregation layer. As described above, the first convolution layer may consist of eight one-dimensional filters of size three, and the second convolution layer may consist of eight one-dimensional filters of size four.

Next, at 306, the lagging marker prediction program 110A, 110B submits the second output of the second convolution layer to the aggregation layer. The lagging marker prediction program 110A, 110B may utilize the API as described above to submit the second output of the second convolution layer to the aggregation layer. The output of the second convolution layer is described in step 206.

Then, at 308, the lagging marker prediction program 110A, 110B generates the one or more temporal feature summaries. The one or more temporal feature summaries may be generated based on the second output of the aggregation layer. The generation of the one or more feature summaries is described in step 208. The one or more temporal feature summaries may quantify a current leading marker, i.e., a leading marker from the period within the past 12 months of a current date.

Next, at 310, the lagging marker prediction program 110A, 110B submits the one or more temporal feature summaries to the decision tree model. The lagging marker prediction program 110A, 110B may utilize the API as described above to submit the one or more temporal feature summaries to the decision tree model.

Then, at 312, the lagging marker prediction program 110A, 110B generates the one or more second lagging markers. The one or more second lagging markers may be generated based on the one or more temporal feature summaries. The decision tree model may process the one or more feature summaries as described in step 210 to generate the one or more second lagging markers. For example, if the second plurality of leading markers are 0.42 for leading marker one, 0.91 for leading marker two, −0.68 for leading marker three, and −0.57 for leading marker four, where 0.42, 0.91, −0.68, and −0.57 are temporal feature summaries, the generated first lagging marker may be 0.78 no risk, i.e., there is a 78% chance of retaining the client.

Next, at 314, the lagging marker prediction program, 110A, 110B presents the output of the decision tree model, i.e., the one or more second lagging markers, with a lime visualization model. The lime visualization model may list the second plurality of leading markers in an order of their contribution to the predicted output of the one or more second lagging markers. In the example above, the temporal feature summary 0.42 for leading marker one may generate a 0.82 value for no risk, the temporal feature summary 0.91 for leading marker two may generate a 0.52 value for risk, the temporal feature summary −0.68 for leading marker three may generate a 0.34 value for risk, and the temporal feature summary −0.57 for leading marker four may generate a 0.21 value for no risk. The values 0.82, 0.52, 0.34, and 0.21 may be the outputs from the lime visualization model, and may indicate the relative health of the leading markers. For example, a 0.82 value of no risk indicates that the current value of leading marker one may be rated 0.82 on a performance scale from −1 to 1, where 1 is the highest positive performance a leading marker can achieve. Therefore, from top to bottom in the lime visualization model, leading marker one may be listed first, leading marker two may be listed second, leading marker three may be listed third, and leading marker four may be listed fourth. The lime visualization model may thus provide insight into the causes of the predicted values of the one or more second lagging markers.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
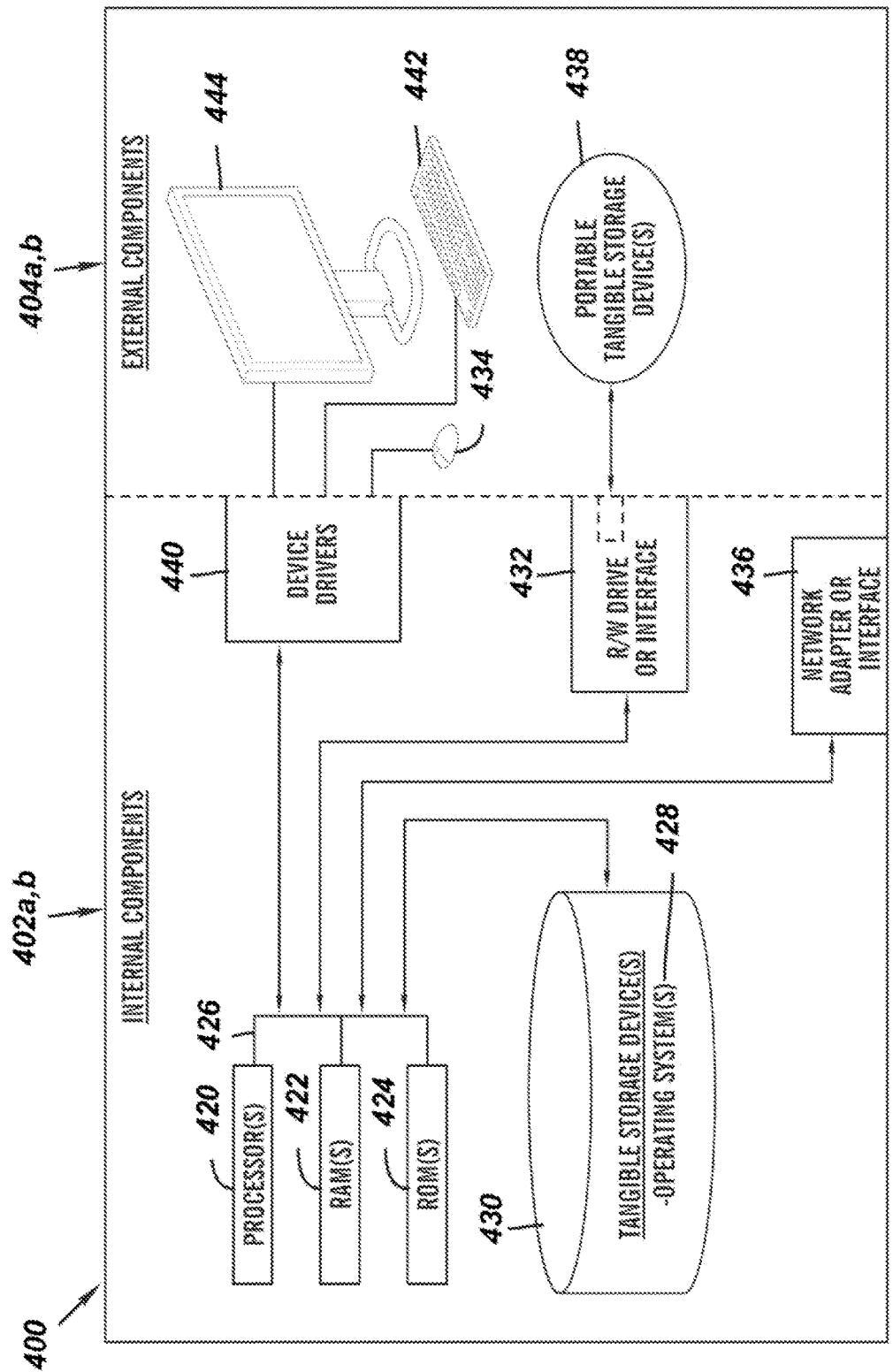
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the lagging marker prediction program 110A in the client computing device 102 and the lagging marker prediction program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the lagging marker prediction program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the lagging marker prediction program 110A in the client computing device 102 and the lagging marker prediction program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the lagging marker prediction program 110A in the client computing device 102 and the lagging marker prediction program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
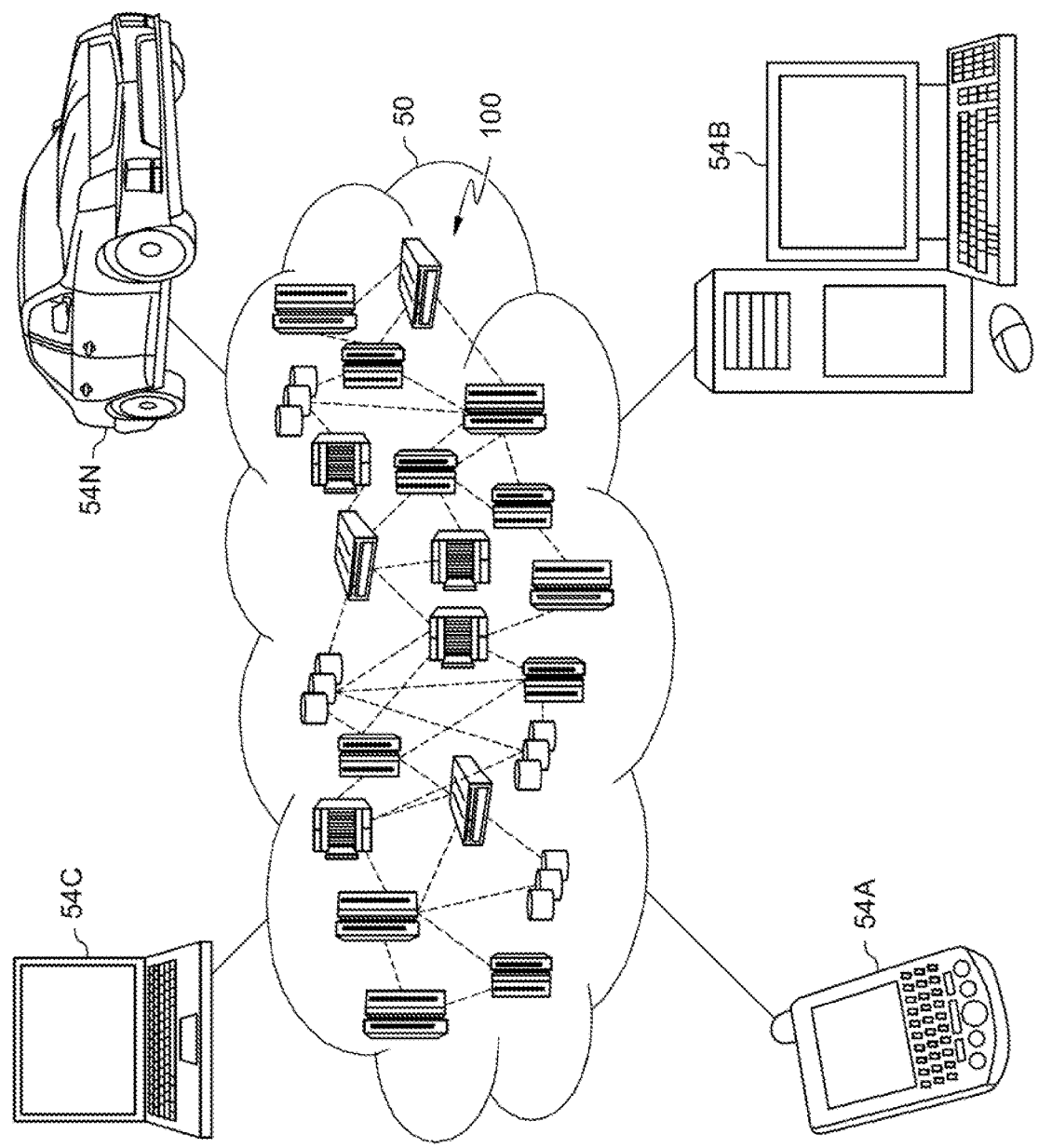
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
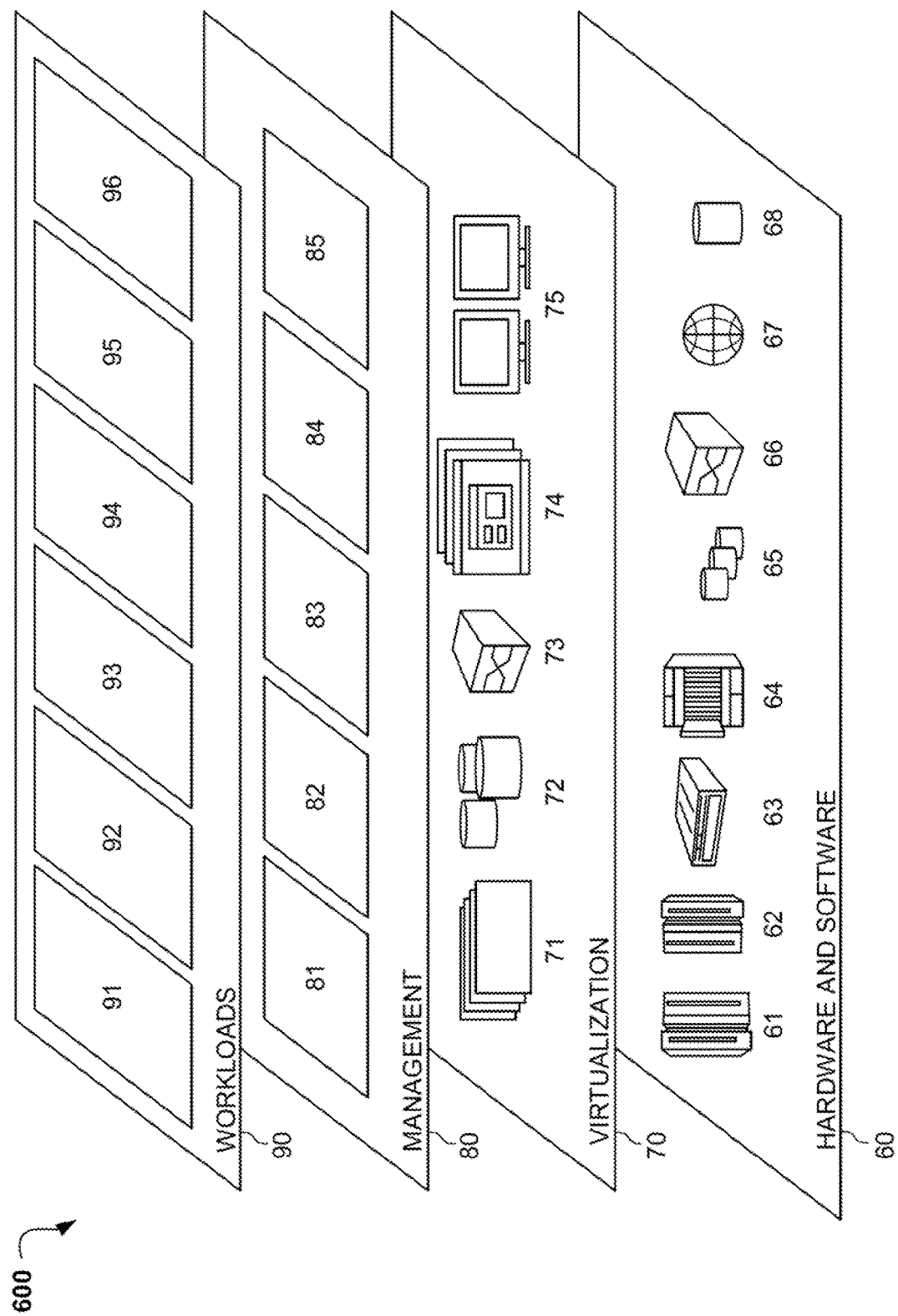
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and lagging marker prediction 96. Lagging marker prediction 96 may relate to the use of a cognitive solution to capture leading markers in order to provide forecasts of the metrics for lagging markers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of training a forecasting model, the method comprising:
   receiving a first 12-month history of a plurality of leading markers;
   submitting the first plurality of leading markers to a convolutional neural network model, wherein the convolutional neural network model includes a first convolution layer, a second convolution layer, an aggregation layer, and a regression layer;
   submitting a first output of the second convolution layer to the aggregation layer;
   generating one or more feature summaries based on a first output of the aggregation layer;
   generating one or more first lagging markers, using the regression layer, based on the one or more feature summaries;
   training the convolutional neural network model based on a learned weighted sum of one or more aggregated values of the one or more feature summaries, wherein training the convolutional neural network further comprises:
      comparing the generated one or more first lagging markers with an actual output from a dataset; and
      updating the weighted sum of the one or more aggregated values of the one or more feature summaries;
   removing the regression layer from the trained convolutional neural network model;
   creating a decision tree model based on the one or more feature summaries; and
   training the decision tree model based on the one or more feature summaries to generate one or more updated first lagging markers.

2. The method of claim 1, further comprising:
   receiving a second 12-month history of a plurality of leading markers;
   submitting the second plurality of leading markers to the convolutional neural network model, wherein the convolutional neural network model includes the first convolution layer, the second convolution layer, and the aggregation layer;
   submitting a second output of the second convolution layer to the aggregation layer;
   generating one or more temporal feature summaries based on a second output of the aggregation layer;
   submitting the one or more temporal feature summaries to the decision tree model;
   generating one or more second lagging markers based on the one or more temporal feature summaries; and
   presenting an output of the decision tree model with a Local Interpretable Model-agnostic Explanations visualization model.

3. The method of claim 2, wherein a time by which the second 12-month history of the plurality of leading markers lags is selected from a group consisting of one month, two months, and three months.

4. The method of claim 2, wherein the second plurality of leading markers are presented in an order of their contribution to the presented output in the Local Interpretable Model-agnostic Explanations visualization model.

5. The method of claim 1, wherein the first convolution layer consists of eight one-dimensional filters of size three, and the second convolution layer consists of eight one-dimensional filters of size four.

6. The method of claim 1, wherein training the decision tree model further comprises:
   comparing the generated one or more updated first lagging markers with an actual output from a dataset.

7. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving a first 12-month history of a plurality of leading markers;
   submitting the first plurality of leading markers to a convolutional neural network model, wherein the convolutional neural network model includes a first convolution layer, a second convolution layer, an aggregation layer, and a regression layer;
   submitting a first output of the second convolution layer to the aggregation layer;
   generating one or more feature summaries based on a first output of the aggregation layer;
   generating one or more first lagging markers, using the regression layer, based on the one or more feature summaries;
   training the convolutional neural network model based on a learned weighted sum of one or more aggregated values of the one or more feature summaries, wherein training the convolutional neural network further comprises:
      comparing the generated one or more first lagging markers with an actual output from a dataset; and
      updating the weighted sum of the one or more aggregated values of the one or more feature summaries;
   removing the regression layer from the trained convolutional neural network model;
   creating a decision tree model based on the one or more feature summaries; and
   training the decision tree model based on the one or more feature summaries to generate one or more updated first lagging markers.

8. The computer system of claim 7, further comprising:
   receiving a second 12-month history of a plurality of leading markers;
   submitting the second plurality of leading markers to the convolutional neural network model, wherein the convolutional neural network model includes the first convolution layer, the second convolution layer, and the aggregation layer;
   submitting a second output of the second convolution layer to the aggregation layer;
   generating one or more temporal feature summaries based on a second output of the aggregation layer;

submitting the one or more temporal feature summaries to the decision tree model;

generating one or more second lagging markers based on the one or more temporal feature summaries; and presenting an output of the decision tree model with a Local Interpretable Model-agnostic Explanations visualization model.

9. The computer system of claim 8, wherein a time by which the second 12-month history of the plurality of leading markers lags is selected from a group consisting of one month, two months, and three months.

10. The computer system of claim 8, wherein the second plurality of leading markers are presented in an order of their contribution to the presented output in the Local Interpretable Model-agnostic Explanations visualization model.

11. The computer system of claim 7, wherein the first convolution layer consists of eight one-dimensional filters of size three, and the second convolution layer consists of eight one-dimensional filters of size four.

12. The computer system of claim 7, wherein training the decision tree model further comprises:

comparing the generated one or more updated first lagging markers with an actual output from a dataset.

13. A computer program product, the computer program product comprising:

one or more computer-readable tangible storage medium and program instructions stored on at least one of the one or more tangible storage medium, the program instructions executable by a processor capable of performing a method, the method comprising:

receiving a first 12-month history of a plurality of leading markers;

submitting the first plurality of leading markers to a convolutional neural network model, wherein the convolutional neural network model includes a first convolution layer, a second convolution layer, an aggregation layer, and a regression layer;

submitting a first output of the second convolution layer to the aggregation layer;

generating one or more feature summaries based on a first output of the aggregation layer;

generating one or more first lagging markers, using the regression layer, based on the one or more feature summaries;

training the convolutional neural network model based on a learned weighted sum of one or more aggregated values of the one or more feature summaries, wherein training the convolutional neural network further comprises:

comparing the generated one or more first lagging markers with an actual output from a dataset; and updating the weighted sum of the one or more aggregated values of the one or more feature summaries;

removing the regression layer from the trained convolutional neural network model;

creating a decision tree model based on the one or more feature summaries; and training the decision tree model based on the one or more feature summaries to generate one or more updated first lagging markers.

14. The computer program product of claim 13, further comprising:

receiving a second 12-month history of a plurality of leading markers;

submitting the second plurality of leading markers to the convolutional neural network model, wherein the convolutional neural network model includes the first convolution layer, the second convolution layer, and the aggregation layer;

submitting a second output of the second convolution layer to the aggregation layer;

generating one or more temporal feature summaries based on a second output of the aggregation layer;

submitting the one or more temporal feature summaries to the decision tree model;

generating one or more second lagging markers based on the one or more temporal feature summaries; and presenting an output of the decision tree model with a Local Interpretable Model-agnostic Explanations visualization model.

15. The computer program product of claim 14, wherein a time by which the second 12-month history of the plurality of leading markers lags is selected from a group consisting of one month, two months, and three months.

16. The computer program product of claim 13, wherein the first convolution layer consists of eight one-dimensional filters of size three, and the second convolution layer consists of eight one-dimensional filters of size four.

17. The computer program product of claim 13, wherein training the decision tree model further comprises:

comparing the generated one or more updated first lagging markers with an actual output from a dataset.

* * * * *